(12) United States Patent
Jano et al.

(10) Patent No.: US 12,309,746 B2
(45) Date of Patent: May 20, 2025

(54) ENERGY-EFFICIENT AND RRC STATE AWARE RADIO RESOURCE ALLOCATION

(71) Applicant: Nokia Technologies Oy, Espoo (FI)

(72) Inventors: Alba Jano, Munich (DE); Wolfgang Kellerer, Fuerstenfeldbruck (DE); Halit Murat Gürsu, Munich (DE); Rakash Sivasiva Ganesan, Unterhaching (DE); Nitin Mangalvedhe, Hoffman Estates, IL (US); Rapeepat Ratasuk, Inverness, IL (US); Philippe Godin, Versailles (FR); Srinivasan Selvaganapathy, Bangalore (IN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/839,159

(22) PCT Filed: Feb. 18, 2022

(86) PCT No.: PCT/EP2022/054071
§ 371 (c)(1),
(2) Date: Aug. 16, 2024

(87) PCT Pub. No.: WO2023/155998
PCT Pub. Date: Aug. 24, 2023

(65) Prior Publication Data
US 2025/0113335 A1    Apr. 3, 2025

(51) Int. Cl.
*H04W 68/02*     (2009.01)
*H04L 5/00*      (2006.01)
*H04W 74/0833*   (2024.01)

(52) U.S. Cl.
CPC ........... *H04W 68/02* (2013.01); *H04L 5/0053* (2013.01); *H04W 74/0833* (2013.01)

(58) Field of Classification Search
CPC .. H04W 68/02; H04W 74/0833; H04L 5/0053
(Continued)

(56) References Cited

U.S. PATENT DOCUMENTS

2019/0394812 A1* 12/2019 Kuo ..................... H04W 68/00
2021/0185637 A1   6/2021 Agarwal et al.

FOREIGN PATENT DOCUMENTS

WO       2020069103 A1    4/2020

OTHER PUBLICATIONS

International Search Report issued by the European Patent Office acting as the International Searching Authority in relation to International Application No. PCT/EP2022/054071 dated Sep. 22, 2022 (3 pages).

(Continued)

*Primary Examiner* — Joel Ajayi
(74) *Attorney, Agent, or Firm* — Robert P. Michal, Esq.; Carter, DeLuca & Farrell LLP

(57) ABSTRACT

Techniques of preserving UE and network resources while performing a paging procedure during cell congestion includes a network node informing a UE if the cell to which the UE is attempting to access is too congested to serve the UE. When a gNB, serving a cell, receives a paging request for the gNB to serve a UE, the gNB first performs a pro-active admission control operation to determine whether there are sufficient resources to serve the UE. When there is too much congestion, the gNB may not admit the UE to the cell and sends RAN raging with a paging flag indicating that the gNB will not serve the UE. The UE in response does not trigger a service request, but rather sends an ACK paging over RRC to the gNB, which in turn notifies the AMF of non-service and that the UE is present.

1 Claim, 8 Drawing Sheets

(58) Field of Classification Search
USPC .......................................................... 455/458
See application file for complete search history.

(56) References Cited

OTHER PUBLICATIONS

Written Opinion of the International Searching Authority issued by the European Patent Office acting as the International Searching Authority in relation to International Application No. PCT/EP2022/054071 dated Sep. 22, 2022 (6 pages).

* cited by examiner

ENERGY-EFFICIENT AND RRC STATE AWARE RADIO RESOURCE ALLOCATION

CROSS-REFERENCE TO RELATED APPLICATIONS

This application is a national phase entry under 35 U.S.C. 371 of PCT International Application No. PCT/EP2022/054071 filed Feb. 18, 2022, the disclosure of this application is expressly incorporated herein by reference in its entirety.

TECHNICAL FIELD

This description relates to telecommunications systems.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes transmitting, by a network node within a wireless network to a user device, a first paging message providing an indication that the network node is unable to serve the user device for service which has triggered the first paging message. The method also includes receiving, from the user device, a random access preamble as part of a random access procedure. The method further includes, in response to receiving the random access preamble, transmitting, to the user device, a random access response. The method further includes receiving, from the user device, an acknowledgment of the first paging message in place of a service request to terminate the random access procedure.

According to an example implementation, an apparatus includes at least one processor and at least one memory including computer program code, the at least one memory and the computer program code configured to, with the at least one processor, cause the apparatus at least to transmit, by a network node within a wireless network to a user device, a first paging message providing an indication that the network node is unable to serve the user device for service which has triggered the first paging message. The at least one memory and the computer program code are also configured to, with the at least one processor, cause the apparatus at least to receive, from the user device, a random access preamble as part of a random access procedure. The at least one memory and the computer program code are further configured to, with the at least one processor, cause the apparatus at least to, in response to receiving the random access preamble, transmit, to the user device, a random access response. The at least one memory and the computer program code are further configured to, with the at least one processor, cause the apparatus at least to receive, from the user device, an acknowledgment of the first paging message in place of a service request to terminate the random access procedure.

According to an example implementation, an apparatus includes means for transmitting, by a network node within a wireless network to a user device, a first paging message providing an indication that the network node is unable to serve the user device for service which has triggered the first paging message. The apparatus also includes means for receiving, from the user device, a random access preamble as part of a random access procedure. The apparatus further includes means for, in response to receiving the random access preamble, transmitting, to the user device, a random access response. The apparatus further includes means for receiving, from the user device, an acknowledgment of the first paging message in place of a service request to terminate the random access procedure.

According to an example implementation, a computer program product includes a computer-readable storage medium and storing executable code that, when executed by at least one data processing apparatus, is configured to cause the at least one data processing apparatus to transmit, by a network node within a wireless network to a user device, a first paging message providing an indication that the network node is unable to serve the user device for service which has triggered the first paging message. The computer-readable storage medium also stores executable code that, when executed by at least one data processing apparatus, is configured to cause the at least one data processing apparatus to receive, from the user device, a random access preamble as part of a random access procedure. The computer-readable storage medium further stores executable code that, when executed by at least one data processing apparatus, is configured to cause the at least one data processing apparatus to, in response to receiving the random access preamble, transmit, to the user device, a random access response. The computer-readable storage medium further stores executable code that, when executed by at least one data processing apparatus, is configured to cause the at least one data processing apparatus to receive, from the user device, an acknowledgment of the first paging message in place of a service request to terminate the random access procedure.

According to an example implementation, a method includes receiving, by a user device in a wireless network from a network node of the wireless network, a radio paging message providing an indication that the network node is unable to serve the user device for the service which triggered the radio paging message. The method also includes initiating, by the user device, a random access procedure with the network node. The method further includes, after receiving a response from the network node to the initiation of the random access procedure, transmitting an acknowledgment of the paging message to terminate the random access procedure and refraining from sending a subsequent service request for the service which triggered the radio paging message.

According to an example implementation, an apparatus includes at least one processor and at least one memory including computer program code, the at least one memory and the computer program code configured to, with the at least one processor, cause the apparatus at least to receive, by a user device in a wireless network from a network node of the wireless network, a radio paging message providing an indication that the network node is unable to serve the user device for the service which triggered the radio paging message. The at least one memory and the computer program code are also configured to initiate, by the user device, a random access procedure with the network node. The at least one memory and the computer program code are further configured to, after receiving a response from the network node to the initiation of the random access procedure, transmit an acknowledgment of the paging message to terminate the random access procedure and refrain from sending a subsequent service request for the service which triggered the radio paging message.

According to an example implementation, an apparatus includes means for receiving, by a user device in a wireless network from a network node of the wireless network, a radio paging message providing an indication that the network node is unable to serve the user device for the service which triggered the radio paging message. The apparatus also includes means for initiating, by the user device, a random access procedure with the network node. The apparatus further includes means for, after receiving a response from the network node to the initiation of the random access procedure, transmitting an acknowledgment of the paging message to terminate the random access procedure and refraining from sending a subsequent service request for the service which triggered the radio paging message.

According to an example implementation, a computer program product includes a computer-readable storage medium and storing executable code that, when executed by at least one data processing apparatus, is configured to cause the at least one data processing apparatus to receive, by a user device in a wireless network from a network node of the wireless network, a radio paging message providing an indication that the network node is unable to serve the user device for the service which triggered the radio paging message. The executable code, when executed by at least one data processing apparatus, is also configured to cause the at least one data processing apparatus to initiate, by the user device, a random access procedure with the network node. The executable code, when executed by at least one data processing apparatus, is further configured to cause the at least one data processing apparatus to, after receiving a response from the network node to the initiation of the random access procedure, transmit an acknowledgment of the paging message to terminate the random access procedure and refrain from sending a subsequent service request for the service which triggered the radio paging message.

According to an example implementation, a method includes transmitting, by an access and mobility management unit associated with a wireless network to a network node of the wireless network, a paging message providing an indication of downlink data and associated service incoming to the wireless network and including assistance information indicating energy efficiency parameters for a user device camping on a cell served by the network node. The method further includes receiving, by the access and mobility management unit from the network node, a non-delivery message indicating that the network node is not serving the user equipment due to insufficient radio resources.

According to an example implementation, an apparatus includes at least one processor and at least one memory including computer program code, the at least one memory and the computer program code configured to, with the at least one processor, cause the apparatus at least to transmit, by an access and mobility management unit associated with a wireless network to a network node of the wireless network, a paging message providing an indication of downlink data and associated service incoming to the wireless network and including assistance information indicating energy efficiency parameters for a user device camping on a cell served by the network node. The at least one memory and the computer program code are further configured to receive, by the access and mobility management unit from the network node, a non-delivery message indicating that the network node is not serving the user device for the involved service due to insufficient radio resources.

According to an example implementation, an apparatus includes means for transmitting, by an access and mobility management unit associated with a wireless network to a network node of the wireless network, a paging message providing an indication of downlink data and associated service incoming to the wireless network and including assistance information indicating energy efficiency parameters for a user device camping on a cell served by the network node. The apparatus further includes means for receiving, by the access and mobility management unit from the network node, a non-delivery message indicating that the network node is not serving the user equipment due to insufficient radio resources.

According to an example implementation, a computer program product includes a computer-readable storage medium and storing executable code that, when executed by at least one data processing apparatus, is configured to cause the at least one data processing apparatus to transmit, by an access and mobility management unit associated with a wireless network to a network node of the wireless network, a paging message providing an indication of downlink data and associated service incoming to the wireless network and including assistance information indicating energy efficiency parameters for a user device camping on a cell served by the network node. The executable code, when executed by at least one data processing apparatus, is further configured to cause the at least one data processing apparatus to receive, by the access and mobility management unit from the network node, a non-delivery message indicating that the network node is not serving the user device for the involved service due to insufficient radio resources.

The details of one or more examples of implementations are set forth in the accompanying drawings and the description below. Other features will be apparent from the description and drawings, and from the claims.

DETAILED DESCRIPTION

The principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Figure 1:
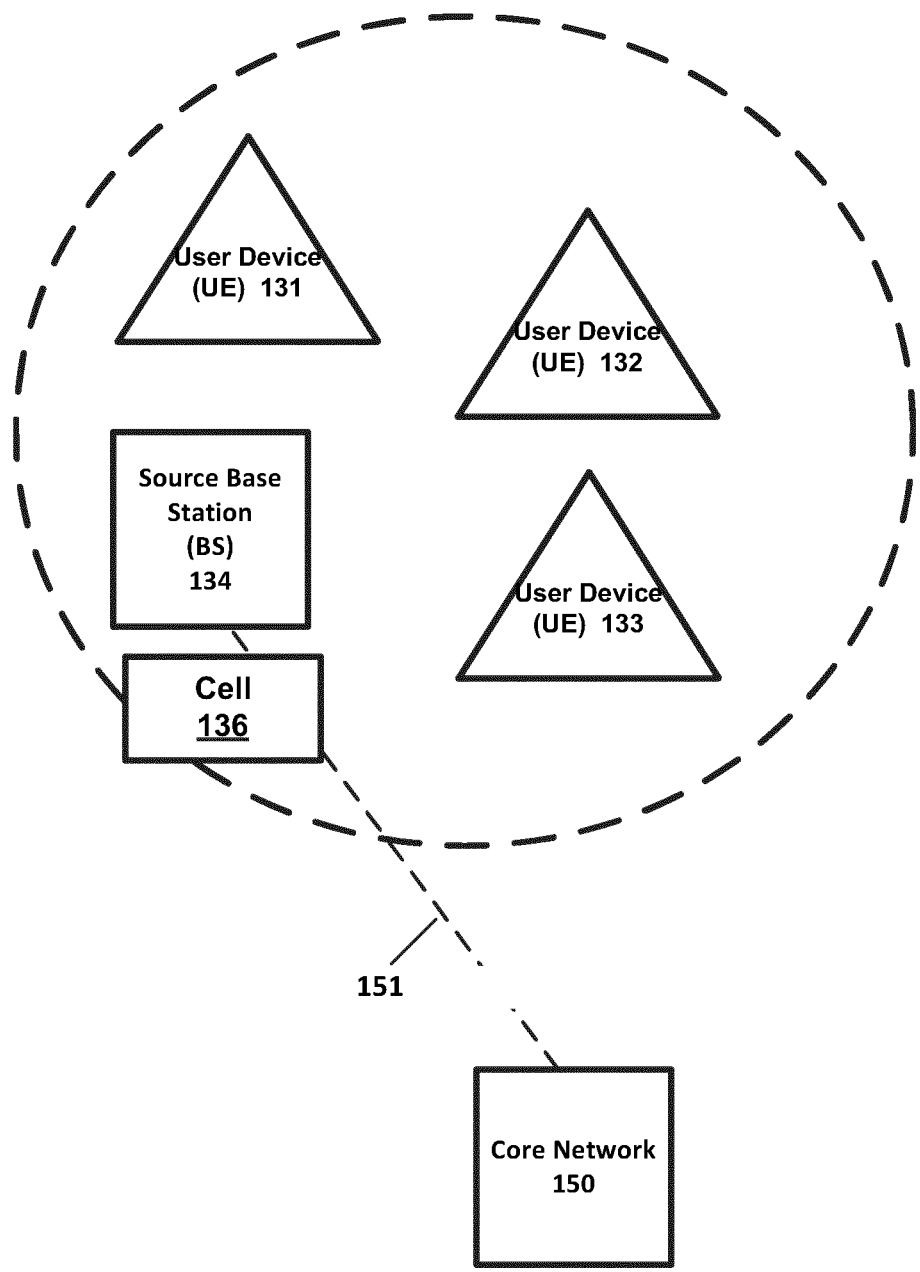
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e) Node B (eNB) may be also be carried out by any node, server or host which may be operably coupled to a transceiver, such as a remote radio head. BS (or AP) 134 provides wireless coverage within a cell 136, including the user devices 131, 132 and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/serving cell change of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Reduced Capability UEs

In 3GPP Rel-17, Reduced capability (RedCap) UEs is introduced in RP-193238. The reduced capability UEs have lower device cost and complexity as compared to high-end eMBB and URLLC devices of Release 15/Release 16. Moreover, most use cases require that the standard enables a device system should support all FR1/FR2 bands for FDD and TDD. The intended use cases for reduced capability User Equipment (UEs) include:

Industrial wireless sensors: Reference use cases and requirements are described in TR 22.832 and TS 22.104. Communication service availability is 99.99% and end-to-end latency less than 100 ms. The reference bit rate is less than 2 Mbps (potentially asymmetric e.g. UL heavy traffic) for all use cases and the device is stationary. The battery should last at least few years. For safety related sensors, latency requirement is lower, 5-10 ms Video Surveillance: As described in TS 22.804, reference economic video bitrate would be 2-4 Mbps, latency<500 ms, reliability 99%-99.9%. High-end video e.g. for farming would require 7.5-25 Mbps. It is noted that traffic pattern is dominated by UL transmissions.

Wearables: Reference bitrate for smart wearable application can be 10-50 Mbps in DL and minimum 5 Mbps in UL and peak bit rate of the device is higher, 150 Mbps for downlink and 50 Mbps for uplink. Battery of the device should last multiple days (up to 1-2 weeks).

Random Access Procedure

Triggers of Random Access Channel (RACH) procedure are as follows:
1. Initial access from RRC Idle device, establishing the connection using the RRC Setup message. The outcome of the procedure is establishment of an RRC connection involving SRB.
2. The transition from RRC Inactive to RRC Connected, triggered from upper layers (when responding to paging). The purpose of the device's transition from RRC Inactive to RRC Connected state, is to resume a suspended connection, including resuming Signal Radio Bearers (SRBs) and Data Radio Bearers (DRBs) or perform an RNA update.

The RACH procedure is as follows.
1. MSG1: Random access preamble transmission.

The RRC Idle/RRC Inactive device transmits a preamble randomly selected from a set of preambles for contention-based random access. The time when UE transmits the preamble is determined by a list of allowed time slots allocated by the gNB.

2. MSG2: Random Access Response (RAR).

The gNB, successfully receiving the preamble, transmits RAR including a temporary C-RNTI, timing advancement value for adjusting uplink synchronization and uplink resource allocation information for an RRC connection setup/RRC connection resume request message. gNB also includes the received preamble identifier in RAR for the device, so that the device can identify whether RAR is for itself or not.

3. MSG3: RRC connection setup request/RRC connection resume request.

If the upper layers provide Access Category and Access Identities upon requesting the setup/resumption of RRC connection, the device performs the unified access control procedure and sets the setup/resume cause of MSG3 in accordance with the information received by the upper layers. If the access attempt is barred, the procedure ends. Otherwise, the device initiates the transmission of RRC setup/RRC resume request message using uplink resources allocated through the RAR.

4. MSG4: RRC connection setup/RRC connection resume response.

Paging Procedure

The paging procedure is used by the network to request the establishment of an NAS signalling connection to the UE or to request the UE to reestablish the user-plane resources of PDU sessions for downlink user data transport. The network shall initiate the paging procedure for 5GS services when NAS signalling messages or user data is pending to be sent to the UE in RRC Idle or RRC Inactive state.

To initiate the procedure the AMF requests the lower layer to start paging and starts timer T3513. Upon reception of a paging indication, the UE shall initiate a service request procedure to respond to the paging.

The network may stop timer T3513 for the paging procedure when an integrity-protected response is received from the UE and successfully integrity checked by the network. If the response received is not integrity protected, or the integrity check is unsuccessful, timer T3513 for the paging procedure shall be kept running. Upon expiry of timer T3513, the network may reinitiate paging.

NAS Non-Delivery Indication

The NAS Non Delivery Indication procedure is used when the NG-RAN node decides not to start the delivery of a NAS message that has been received over a UE-associated logical NG-connection or the NG-RAN node is unable to ensure that the message has been received by the UE.

The NG-RAN node initiates the procedure by sending a NAS NON DELIVERY INDICATION message to the AMF. The NG-RAN node shall report the non-delivery of a NAS message by including the non-delivered NAS message within the NAS-PDU IE and an appropriate cause value within the Cause IE, e.g., "NG intra system handover triggered", "NG inter system handover triggered" or "Xn handover triggered."

RRC Connection Reject

The network rejects the UE attempt to setup/resume a connection from RRC Idle/RRC Inactive due to various reasons, such as congestion of the cell, the overload of the gNB, or the necessary radio resources for the connection setup cannot be provided.

The RRC Reject procedure is as follows.
1. UE attempts to setup/resume the connection from RRC Idle/RRC Inactive.
2. The gNB is not able to handle the procedure, for instance due to congestion.
3. The gNB sends RRC Reject (with a wait time) to keep the UE in RRC Idle/RRC Inactive.

The RRC Idle and RRC Inactive states, specified in TS 38.331 enable the reduction of the energy consumption and increase the battery efficiency. Meanwhile, the RRC Inactive compared to the RRC Idle state reduces the following:

The delay to access the system and start the data transmission after the device's inactivity periods, and The signaling overhead in the Radio and the Core Network (CN)/RAN interfaces for devices coming from inactivity periods that want to transmit small amounts of data (e.g. MTC devices) or short data bursts (e.g. some types of smartphone traffic).

The importance of the RRC Inactive and RRC Idle state increases considering that the energy efficiency becomes problematic in NR for reduced capability devices, which have a stringent requirement for long battery life and limited accessibility. Therefore, to increase the energy-saving at the device side, RRC Resume and RRC Setup procedure execution need to be considered based on the network context. These procedures consist in the device state transition from RRC Inactive to RRC Connected state, or from RRC Idle to RRC Connected state, respectively. The RRC Setup/RRC Resume procedures are initiated as follows:

by upper layers when the device needs to transit from RRC Idle/RRC Inactive state to RRC Connected state (the device has uplink data to transmit);

or by RRC layer to perform a TA/RNA update;

or by CN or RAN paging.

Even though the RRC Inactive and RRC Idle are energy-efficient states, the transition procedures consume energy for each signal transmitted to set up/resume the connection as specified in TR 38.840. Moreover, for the scenarios with a massive number of reduced capability devices connected to the wireless network, the limited radio resources cannot serve all the devices. Hence, devices that have downlink data to receive in a congested network are characterized with a repetition of unsuccessful RRC Setup/RRC Resume procedure or immediately releasing the established connection. The repetition of procedures is caused by the following:

the continuous paging of the devices;

During the core network paging, a timer at the AMF side triggers retransmission of the paging message upon the timer expiration without receiving a service request message from the paged device. Therefore, the device might be paged multiple times depending on paging retransmission scheme defined in the paging strategy.

During the RAN paging, where the device might be paged multiple times depending on the paging retransmission schemes configured in RAN nodes.

or the wait timer, which is included in the RRC Reject message.

The wait timer specifies the period the device has to wait before executing again the RRC Setup/RRC Resume procedure.

If devices manage to successfully setup/resume the connection, the RAN nodes may trigger the release of the connection. Consequently, executing the transitioning procedures for all the paged devices may cause unnecessary energy consumption if devices cannot receive radio resources. The unnecessary energy consumption is formed by energy consumption for RRC Setup/RRC Resume procedure and the increased energy consumption while the device waits in RRC CONNECTED state, without receiving data, until the connection is released by the NG-RAN node due to the lack of resources. As a result, resource allocation mechanism aware of the RRC state of the devices may be needed, to save the energy of RedCap devices.

Figure 2:
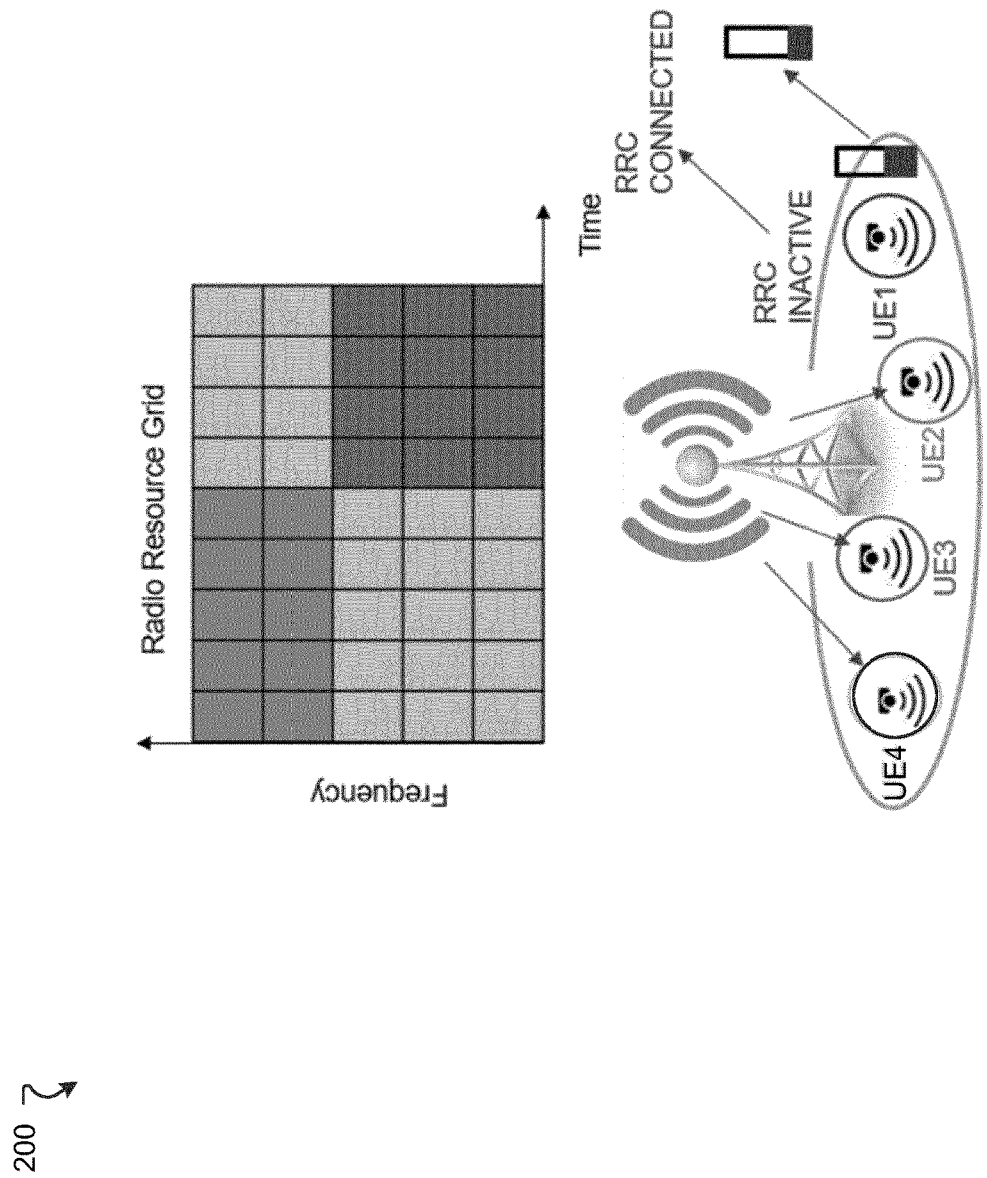
FIG. 2 is a diagram illustrating the resource allocation mechanism problem and device energy consumption when two devices are in RRC Connected state and two other devices are in RRC Inactive state according to an example implementation.

FIG. 2 is a diagram illustrating the resource allocation mechanism problem and device energy consumption when two devices are in RRC Connected state and two other devices are in RRC Inactive state. In this scenario, we consider four UEs, identified as UE1, UE2, UE3, and UE4. UE2 and UE4 are already at RRC Connected state and can receive the downlink information. Meanwhile, UE1 and UE3 are in RRC Inactive state. Due to the paging message triggered from the downlink data, UE1 and UE3 need to transition to RRC Connected state to receive the downlink data. For these devices, the RRC Resume procedure takes place as specified in TS 38.401.

However, the resource allocation algorithm has assigned the radio resources to only three devices (UE2, UE3, UE4) at the specific TTI. The figure depicts the lack of available radio resources for the UE1, even though the device might have successfully transitioned to RRC Connected state. As a result, the battery level of UE1 decreases because of the power consumption during the state transition and the power consumed in the RRC Connected state.

In contrast to the known conventional approaches to performing random access, an improved technique includes a network node informing a UE if the cell to which the UE is attempting to access is too congested to serve the UE. For example, when a gNB serving a cell receives from, e.g., an access and mobility function (AMF), a paging request indicating a request for the gNB to serve a UE, the gNB first performs a proactive admission control operation to determine whether there are sufficient resources to serve the UE. When there is too much congestion, the gNB may not admit the UE to the cell; in this case, the gNB sends RAN paging with a paging flag indicating that the gNB will not serve the UE. The UE in response does not trigger a service request, but rather sends an ACK paging over RRC to the gNB, which in turn notifies the AMF of non-service and that the UE is present.

Advantageously, the above-described improved technique for performing random access helps improve battery life in user devices and reduces wait time by stopping user devices from triggering a service request during a random access procedure.

Figure 3:
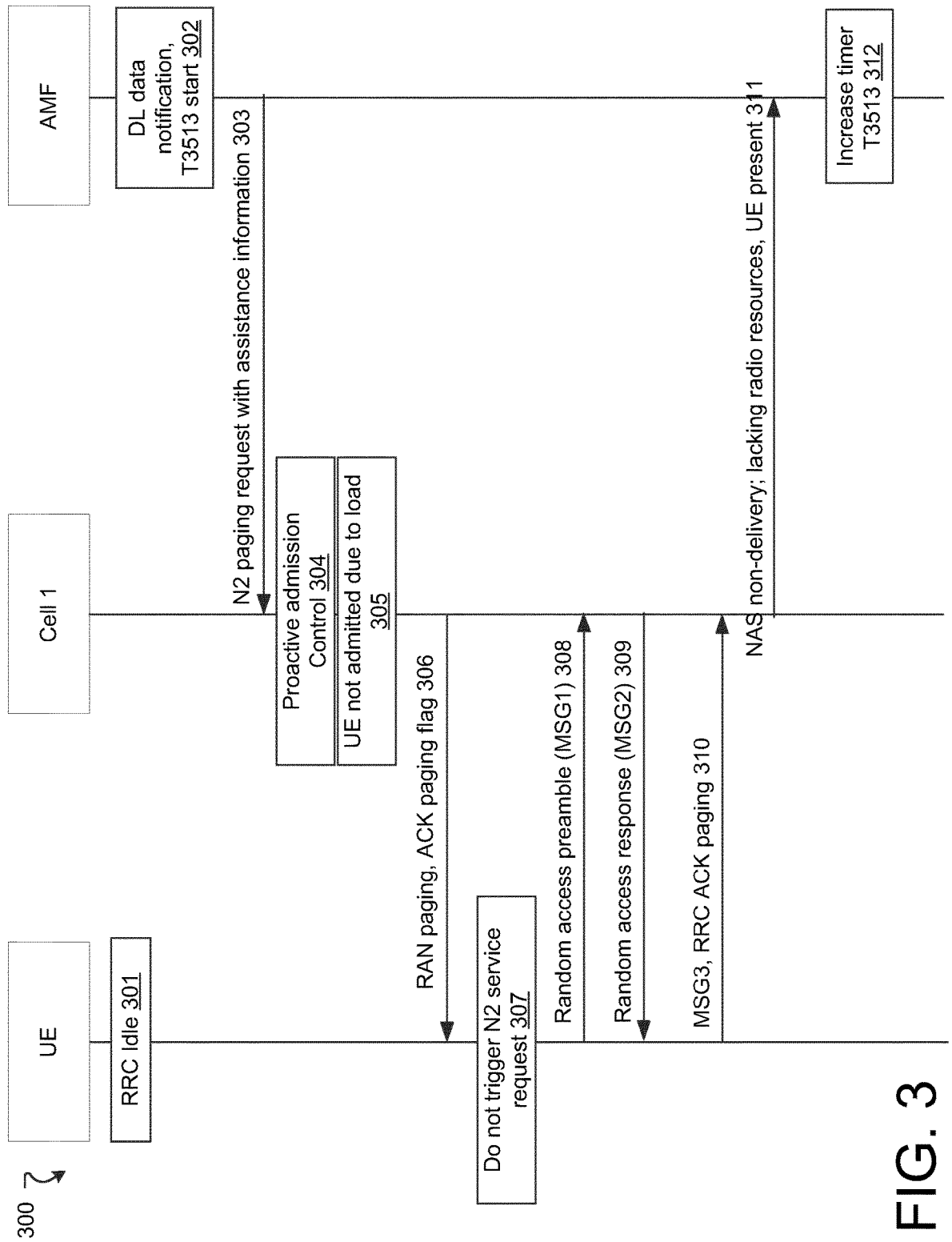
FIG. 3 is a sequence diagram illustrating a procedure for core network paging, according to an example implementation.

FIG. 3 is a sequence diagram illustrating a procedure 300 for core network paging.

At 301, the UE is in RRC Idle mode and is camping in a cell while monitoring the PDCCH channel to receive indications about incoming downlink data. In some implementations, the UE is in Inactive mode At 302, the AMF processes a notification concerning incoming downlink data. At this point, the AMF starts the timer T3513.

At 303, the AMF transmits an N2 paging request to the gNB. The AMF sends assistance information in the N2 paging message for scenarios with energy efficiency requirements from devices.

At 304, the gNB executes pro-active admission control for the PDU sessions to decide if the UE can be admitted and served by the gNB.

At 305, the gNB determines that the cell has too much congestion, i.e., it does not have enough radio resources to serve devices with energy efficiency requirements. Accordingly, the gNB does not admit the UE.

At 306, the gNB transmits RAN paging, with an ACK paging flag, to the UE. Even though the UE is not admitted from gNB, its localization is necessary to avoid escalating the paging message at a large area. Accordingly, the gNB sends an RRC paging message to the device. The paging message includes a one-bit ACK paging flag to indicate the purpose of localization.

At 307, the (RedCap) UE determines to omit sending the service request message upon receiving the one-bit ACK paging flag from the gNB.

At 308, the UE transmits a MSG1 of the RACH procedure (preamble) to the gNB.

At 309, the gNB transmits a MSG2 of the RACH procedure (response) to the UE.

At 310, the UE transmits, in the MSG3 of the RACH procedure, an acknowledgment for the reception of the paging message but omitting the service request message. The reception of the RRC ACK paging by the gNB avoids the paging forwarding in other cells.

At 311, the gNB transmits a NAS non-delivery message to the AMF, as the AMF needs to be informed about not paging the UE (gNB sends a location ACK paging) due to the network congestion. In some implementations, the NAS non-delivery message has an additional field for reporting, to the AMF, the lack of radio resources and the presence of the UE in the paged cell.

At 312, the AMF increases the timer T3513 to reduce the number of paging message retransmissions during the congestion period.

Figure 4:
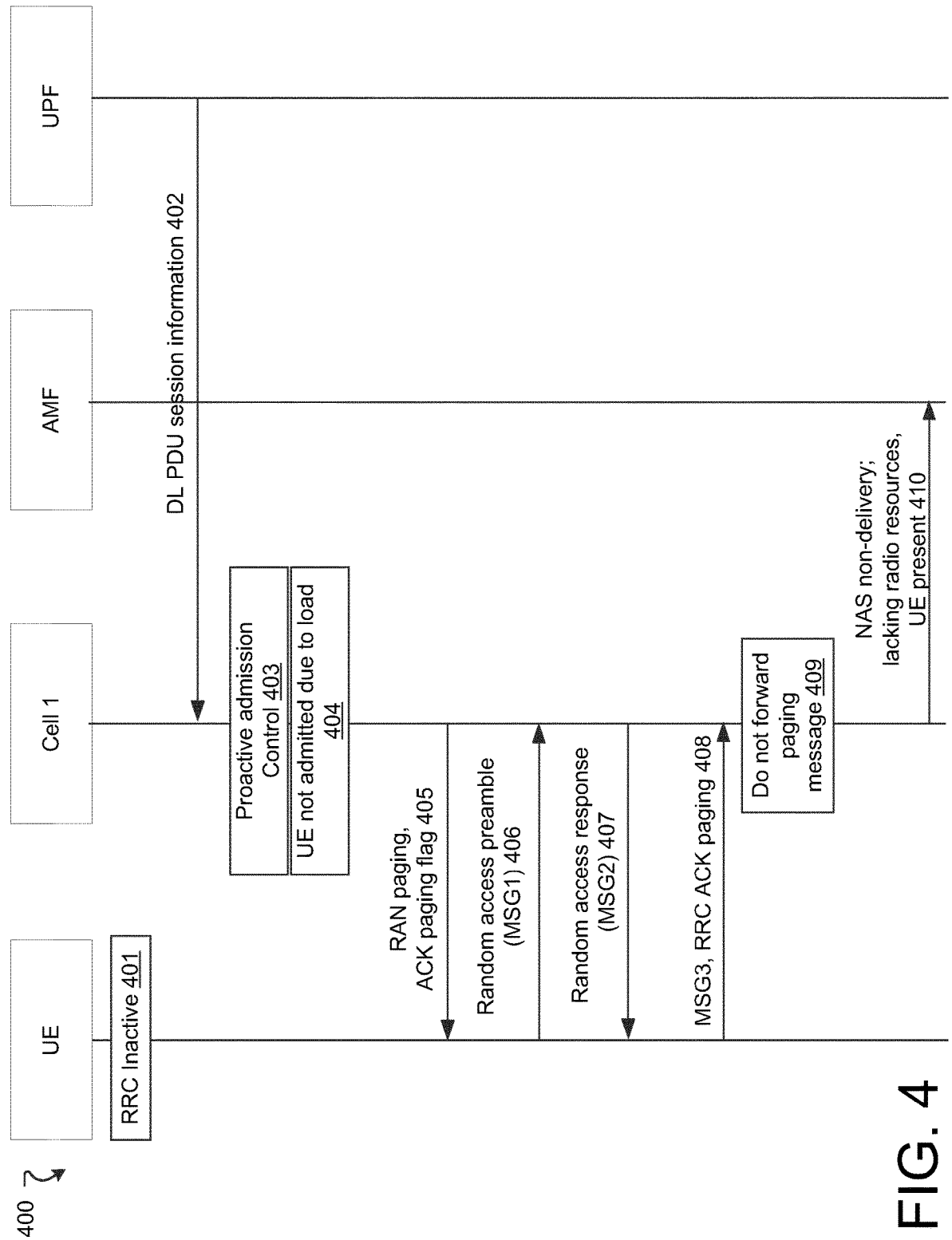
FIG. 4 is a sequence diagram illustrating an procedure for RAN paging, according to an example implementation.

FIG. 4 is a sequence diagram illustrating an procedure 400 for RAN paging.

At 401, the UE is in RRC Inactive mode and is camping in a cell while monitoring the PDCCH channel to receive indications about incoming downlink data. In some implementations, the UE is in Idle mode.

At 402, a user plane function (UPF) sends downlink PDU session information to the gNB. It is noted that gNB receives the paging message from UPF without including the AMF in the paging procedure.

At 403, the gNB executes pro-active admission control for the PDU sessions to decide if the UE can be admitted and served by the gNB.

At 404, the gNB determines that the cell has too much congestion, i.e., it does not have enough radio resources to serve devices with energy efficiency requirements. Accordingly, the gNB does not admit the UE.

At 405, the gNB transmits RAN paging, with an ACK paging flag, to the UE. Even though the UE is not admitted from gNB, its localization is necessary to avoid escalating the paging message at a large area. Accordingly, the gNB sends an RRC paging message to the device. The paging message includes a one-bit ACK paging flag to indicate the purpose of localization.

At 406, the UE transmits a MSG1 of the RACH procedure (preamble) to the gNB.

At 407, the gNB transmits a MSG2 of the RACH procedure (response) to the UE.

At 408, the UE transmits, in the MSG3 of the RACH procedure, an acknowledgment for the reception of the paging message. The reception of the RRC ACK paging from gNB avoids the paging forwarding in other cells.

At 409, the gNB does not forward a paging message.

At 410, the gNB transmits a NAS non-delivery message to the AMF, as the AMF needs to be informed about not paging the UE (gNB sends a location ACK paging) due to the network congestion. In some implementations, the NAS non-delivery message has an additional field for reporting, to the AMF, the lack of radio resources and the presence of the UE in the paged cell.

Figure 5:
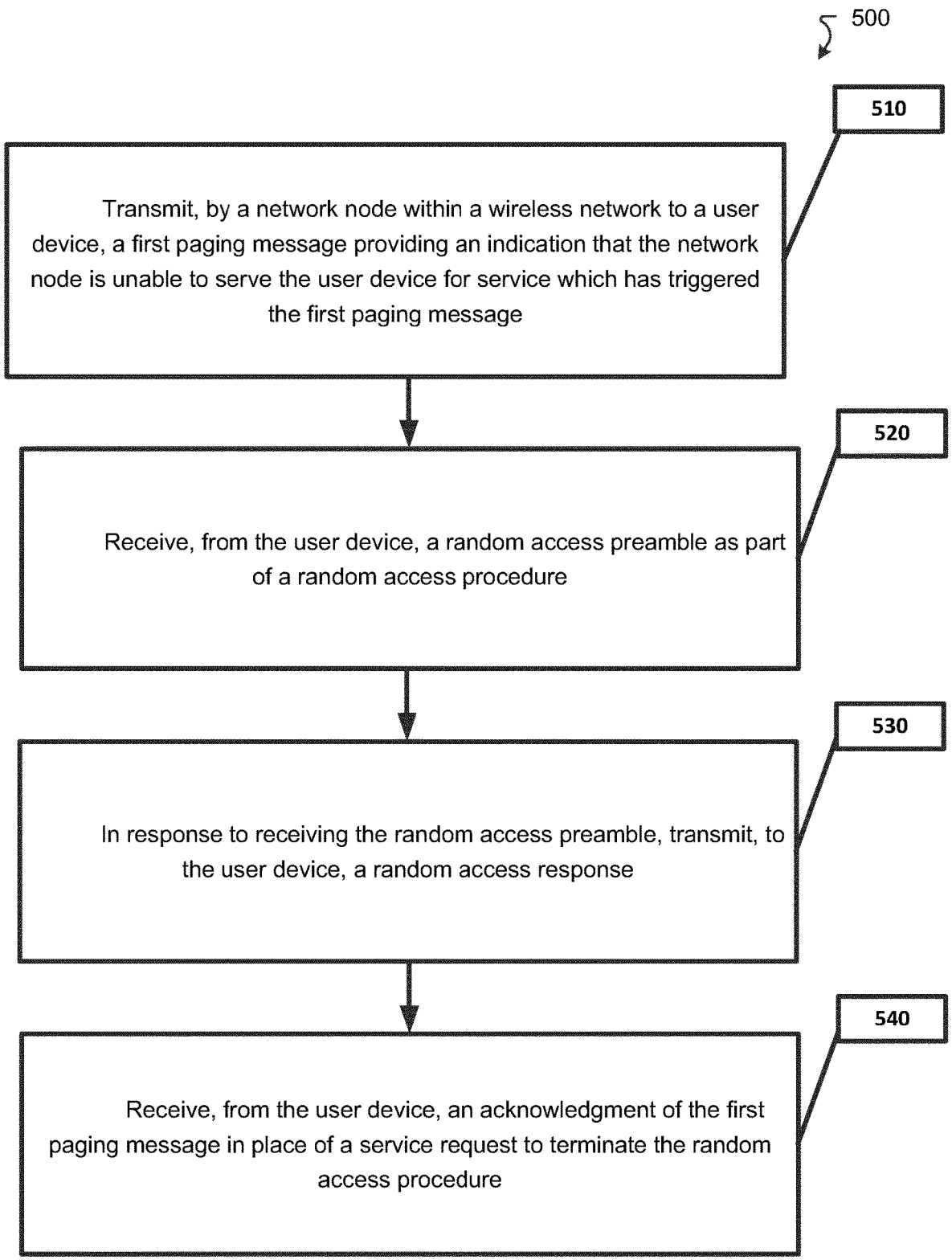
FIG. 5 is a flow chart illustrating a process of preserving device and network resources during random access from the gNB perspective according to an example implementation

Example 1-1: FIG. 5 is a flow chart illustrating a process 500 of preserving UE resources while performing a random access procedure during cell congestion. Operation 510 includes transmitting, by a network node within a wireless network to a user device, a first paging message providing an indication that the network node is unable to serve the user device for service which has triggered the first paging message. Operation 520 includes receiving, from the user device, a random access preamble as part of a random access procedure. Operation 530 includes, in response to receiving the random access preamble, transmitting, to the user device, a random access response. Operation 540 includes receiving, from the user device, an acknowledgment of the first paging message in place of a service request to terminate the random access procedure.

Example 1-2: According to an example implementation of example 1-1, further comprising performing, by the network node, a proactive admission control operation to produce a determination that the network node does not have enough radio resources to serve the user device for the service associated with the incoming data, wherein the first paging message is transmitted in response to performing the proactive admission control operation.

Example 1-3: According to an example implementation of examples 1-1 or 1-2, further comprising receiving, by a network node within a wireless network, a first trigger message providing an indication of downlink data and associated service incoming to the wireless network.

Example 1-4: According to an example implementation of examples 1-1 to 1-3, wherein the proactive admission control operation is performed by the network node in response to receiving the first trigger message.

Example 1-5: According to an example implementation of example 1-4, wherein the first trigger message is a second paging message and is received from a node that serves an access and mobility management function.

Example 1-6: According to an example implementation of example 1-5, wherein the first trigger message includes assistance information including parameter values indicating whether the network node is able to serve the user device.

Example 1-7: According to an example implementation of examples 1~4 to 1-6, further comprising transmitting, to the access and mobility management function, upon receiving the acknowledgment of the second paging message a non-delivery message indicating that the network node is not serving the user equipment for the involved packet data unit session due to insufficient radio resources.

Example 1-8: According to an example implementation of examples 1-3 to 1-7, wherein the first trigger message is received directly from a node that serves a user plane function.

Example 1-98: According to an example implementation of examples 1-3 to 1-6, wherein the first trigger message includes protocol data unit session information enabling to identify the involved service.

Example 1-10: According to an example implementation of examples 1-3 to 1-9, wherein the first paging message includes a one-bit paging flag indicating that the first paging message should not a trigger service request from the user device.

Example 1-11: According to an example implementation of example 1-10, wherein the non-access stratum non-delivery message indicates that the user device is present in a paged cell served by the network node.

Example 1-12: According to an example implementation of examples 1-9 to 1-11, wherein the acknowledgment of the second paging message is received by the network node over a given cell, and wherein the method further comprises refraining from sending further radio paging messages to cells other than the given cell and to other radio access nodes; and limiting the sending of further radio paging messages to other cells based on their location or neighbor relationship with the given cell.

Example 1-13: An apparatus comprising means for performing a method of any of examples 1-1 to 1-12.

Example 1-14: A computer program product including a non-transitory computer-readable storage medium and storing executable code that, when executed by at least one data processing apparatus, is configured to cause the at least one data processing apparatus to perform a method of any of examples 1-1 to 1-12.

Figure 6:
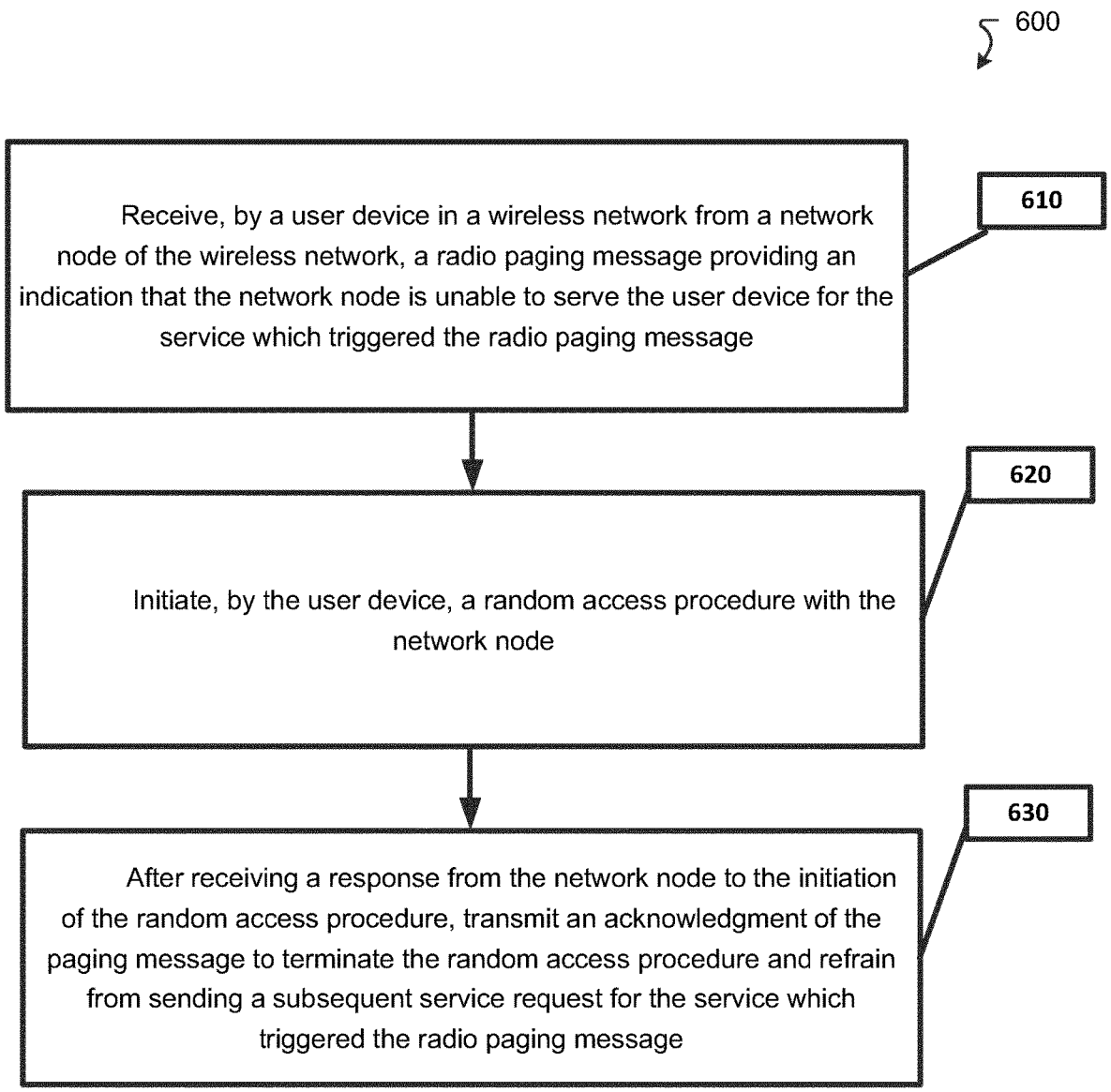
FIG. 6 is a flow chart illustrating a process of preserving device and network resources during random access from the UE perspective according to an example implementation.

Example 2-1: FIG. 6 is a flow chart illustrating a process 600 of preserving UE resources while performing a random access procedure during cell congestion. Operation 610 includes receiving, by a user device in a wireless network from a network node of the wireless network, a radio paging message providing an indication that the network node is unable to serve the user device for the service which triggered the radio paging message. Operation 620 includes initiating, by the user device, a random access procedure with the network node. Operation 630 includes, after receiving a response from the network node to the initiation of the random access procedure, transmitting an acknowledgment of the paging message to terminate the random access procedure and refraining from sending a subsequent service request for the service which triggered the radio paging message.

Example 2-2: According to an example implementation of example 2-1, wherein the user device is a reduced capability device.

Example 2-3: According to an example implementation of examples 2-1 to 2-2, wherein the acknowledgment of the paging message is sent in a MSG3 of the random access procedure.

Example 2-4: According to an example implementation of examples 2-1 to 2-3, further comprising indicating that a given network node serving a given cell should (i) refrain from sending further radio paging messages to other cells than the given cell or to other radio access nodes than the given network node, or (ii) limit the sending of further radio paging messages to other cells based on their location or neighbor relationship with the given cell.

Example 2-5: An apparatus comprising means for performing a method of any of examples 2-1 to 2-4.

Example 2-6: A computer program product including a non-transitory computer-readable storage medium and storing executable code that, when executed by at least one data processing apparatus, is configured to cause the at least one data processing apparatus to perform a method of any of examples 2-1 to 2-4.

Figure 7:
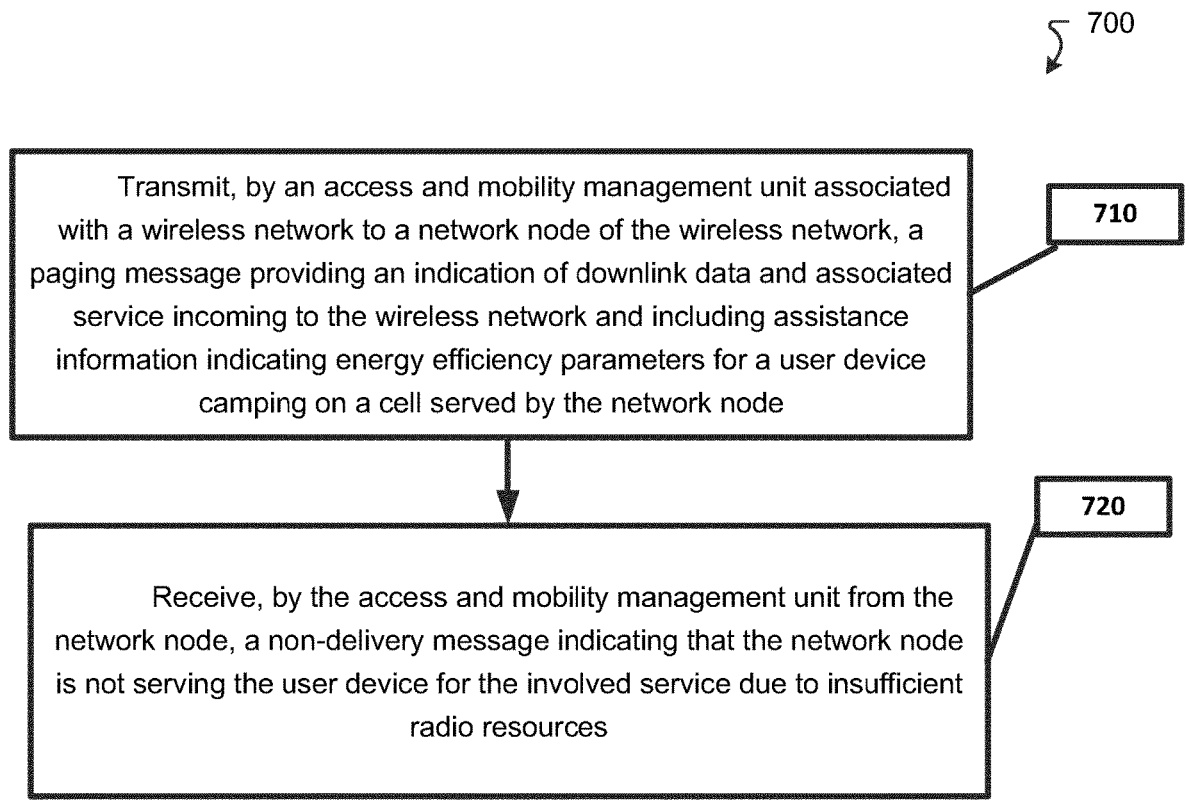
FIG. 7 is a flow chart illustrating a process of preserving device and network resources during random access from the AMF perspective according to an example implementation.

Example 3-1: FIG. 7 is a flow chart illustrating a process 700 of preserving UE resources while performing a random access procedure during cell congestion. Operation 710 includes transmitting, by an access and mobility management unit associated with a wireless network to a network node of the wireless network, a paging message providing an indication of downlink data and associated service incoming to the wireless network and including assistance information indicating energy efficiency parameters for a user device camping on a cell served by the network node. Operation 720 includes receiving, by the access and mobility management unit from the network node, a non-delivery message indicating that the network node is not serving the user equipment due to insufficient radio resources.

Example 3-2: According to an example implementation of example 3-1, wherein the non-delivery message includes a Next Generation Application Protocol non-delivery message.

Example 3-3: According to an example implementation of example 3-2, wherein the next generation application protocol non-delivery message indicates (i) the inability of the network node to serve the user device and (ii) that the user device was reached in a paged cell served by the network node.

Example 3-4: According to an example implementation of examples 3-1 to 3-3, further comprising starting a timer at about the same time as transmitting the paging message to the network node.

Example 3-5: According to an example implementation of example 3-4, further comprising adjusting the timer to reduce a number of paging message retransmissions while the network node is unable to serve the user device due to insufficient radio resources.

Example 3-6: An apparatus comprising means for performing a method of example 3-1.

Example 3-7: A computer program product including a non-transitory computer-readable storage medium and storing executable code that, when executed by at least one data processing apparatus, is configured to cause the at least one data processing apparatus to perform a method of example 3-1.

LIST OF EXAMPLE ABBREVIATIONS

Figure 8:
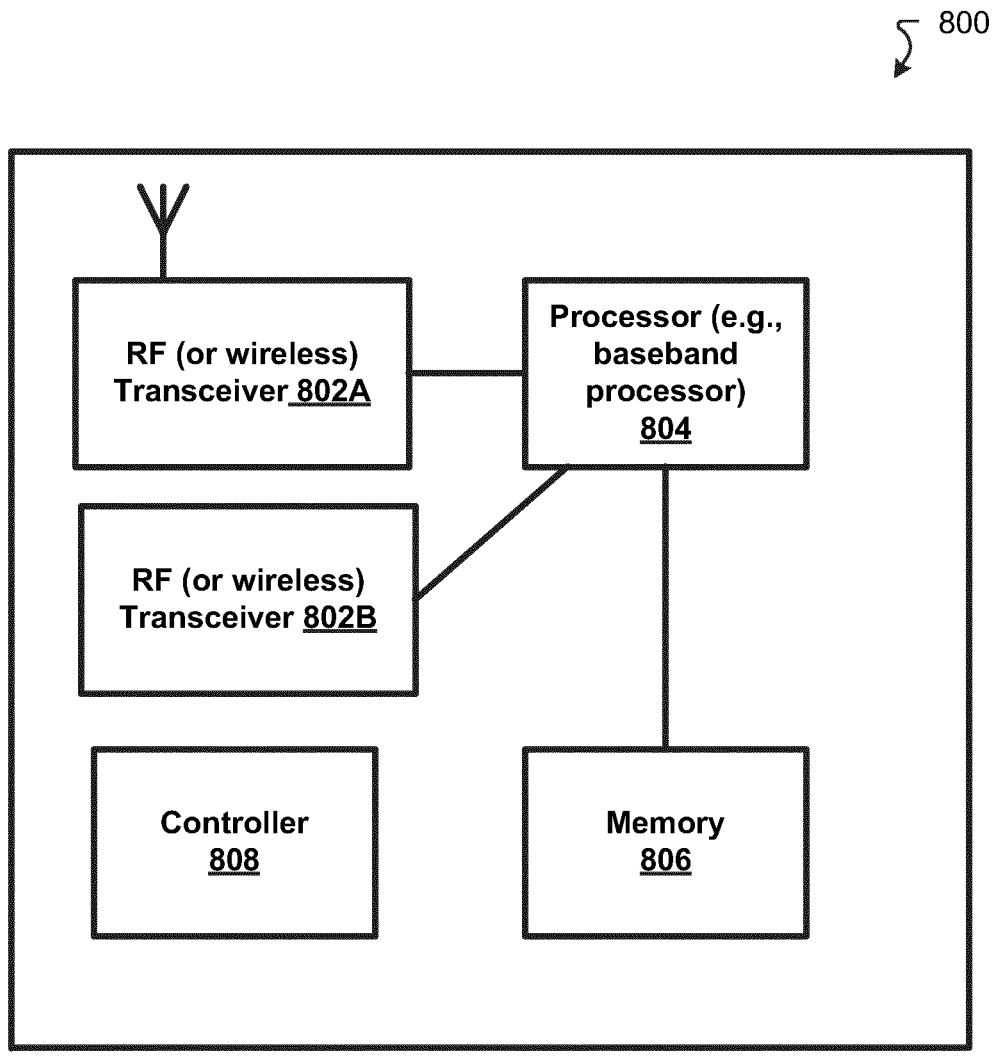
FIG. 8 is a block diagram of a node or wireless station (e.g., base station/access point, relay node, or mobile station/user device) according to an example implementation.

AMF—Core Access and Mobility Management Function
CN—Core Network
DL—Downlink
DRB—Data Radio Bearers
eMBB—enhanced Mobile Broadband
gNB—gNodeB
FDD—Frequency Division Duplex
mIoT—massive Internet of Things
NAS—Non-access stratum
NR—Next Generation
PDU—Protocol Data Unit
PLMN—Public Land Mobile Network
QoE—Quality of Experience
QoS—Quality of Service
TA—Tracking Area
TDD—Time Division Duplex
TTI—Time Transmission Interval
RA—Random Access
RAN—Radio Access Network
RAR—Random Access Response
RNA—RAN Notification Area
RRC—Radio Resource Control
SLA—Service Level Agreement
SRB—Signal Radio Bearer
UE—User Equipment
UL—Uplink
URLLC—Ultra Reliable Low Latency Communication FIG. 8 is a block diagram of a wireless station (e.g., AP, BS, e/gNB, NB-IoT UE, UE or user device) 800 according to an example implementation. The wireless station 800 may include, for example, one or multiple RF (radio frequency) or wireless transceivers 802A, 802B, where each wireless transceiver includes a transmitter to transmit signals (or data) and a receiver to receive signals (or data). The wireless station also includes a processor or control unit/entity (controller) 804 to execute instructions or software and control transmission and receptions of signals, and a memory 806 to store data and/or instructions.

Processor 804 may also make decisions or determinations, generate slots, subframes, packets or messages for transmission, decode received slots, subframes, packets or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8 such as controlling input/output devices (e.g., display, keypad), and/or may execute software for one or more applications that may be provided on wireless station 800, such as, for example, an email program, audio/video applications, a word processor, a Voice over IP application, or other application or software.

In addition, a storage medium may be provided that includes stored instructions, which when executed by a controller or processor may result in the processor 704, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IoT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall as intended in the various embodiments.

What is claimed is:

1. A system, comprising:
    a Next Generation Node B (gNB);
    an access and mobility management function (AMF);
    a user equipment (UE) within the wireless network;
    at least one processor; and
    at least one memory including computer program code;
    the at least one memory and the computer program code configured to cause the system at least to:
        camp the UE in a cell of the gNB, wherein the UE is in radio resource control (RRC) Idle mode;
        process, by the AMF, a notification from the UE concerning incoming downlink data;
        trigger, by the AMF, a timer;
        receive, by the gNB from the AMF, a first trigger message providing an indication of downlink data and associated service incoming to the wireless network,
            wherein the first trigger message is a second paging message,
            wherein the first trigger message includes:
                assistance information including parameter values to enable the gNB to determine that the gNB is not able to serve the UE, and
                protocol data unit session information to enable the gNB to identify the service;
        perform, by the gNB, a proactive admission control operation to produce a determination that the gNB does not have enough radio resources to serve the UE, wherein the proactive admission control operation is performed by the gNB in response to receiving the first trigger message,
        transmit, by the gNB to the UE, a first paging message providing an indication that the gNB is unable to serve the UE for service which has triggered the first paging message, wherein the UE is in RRC Idle mode,
            wherein the first paging message is transmitted in response to the gNB performing the proactive admission control operation,
            wherein the first paging message includes:
                a first one-bit acknowledgement (ACK) paging flag indicating that the first paging message should not trigger a service request from the UE, and
                a second one-bit ACK paging flag configured to indicate that the gNB should avoid escalating the first paging message based on a geographical area of the UE that is not admitted to the gNB, and
            wherein an acknowledgment of the first paging message is received by the gNB over a paged cell served by the gNB;
        receive, by the gNB from the UE, a random access preamble as part of a random access procedure;
        in response to receiving the random access preamble, transmit, by the gNB to the UE, a random access response;
        receive, by the gNB from the UE, an acknowledgment of the first paging message, in place of a service request to terminate the random access procedure;
        transmit, by the gNB to the AMF, an acknowledgment of the second paging message;
        transmit, by the gNB to the AMF, a non-access stratum (NAS) non-delivery message indicating that the gNB is not serving the UE due to insufficient radio resources, wherein the NAS non-delivery message indicates that the UE is present in the paged cell;
        increasing, by the AMF, a time period of the timer that is configured to reduce a number of paging message retransmissions, in response to receiving the NAS non-delivery message, wherein the NAS non-delivery message includes a field for reporting, to the AMF, a lack of radio resources and a presence of the UE in the paged cell;
        refrain, by the gNB from sending further radio paging messages to cells other than the paged cell and to other radio access nodes; and
        limit, by the gNB, the sending of further radio paging messages to other cells based on their location or a neighbor relationship with the paged cell.

* * * * *